Nov. 5, 1957 W. R. WEEKS 2,812,414
PRESSURE COOKING APPARATUS
Filed July 19, 1955
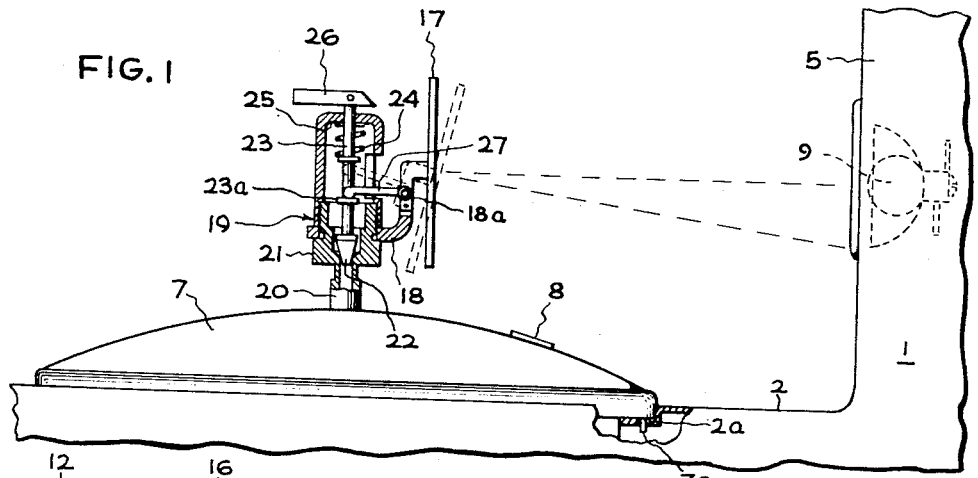
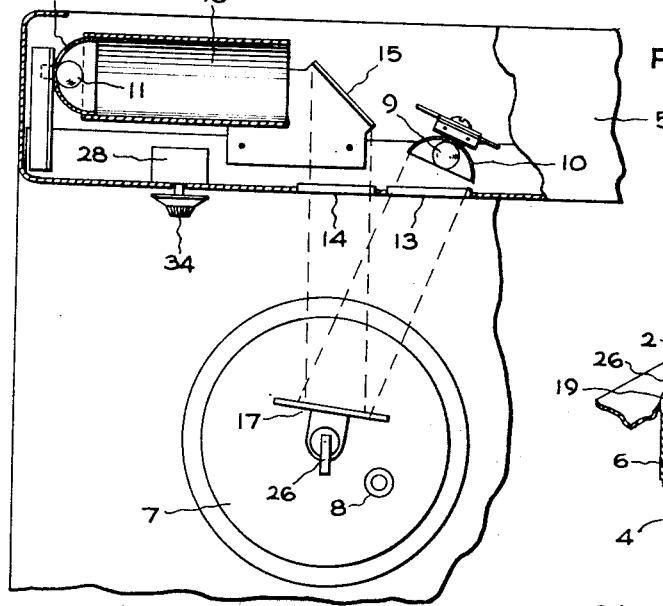
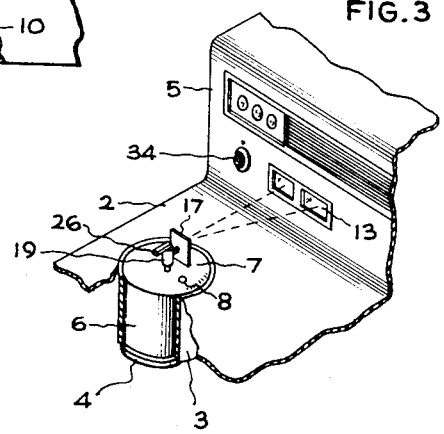
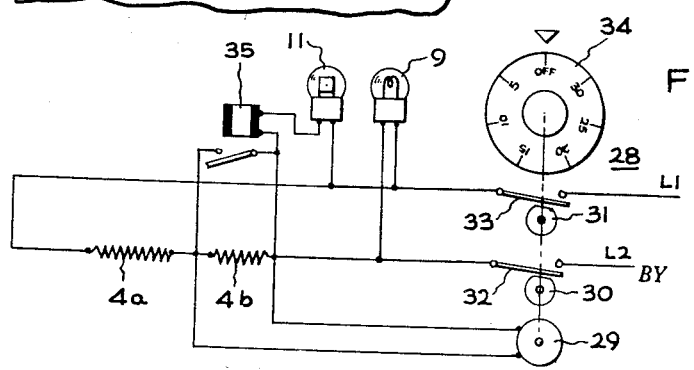
*INVENTOR.*
WALTER R. WEEKS
HIS ATTORNEY United States Patent Office 2,812,414
Patented Nov. 5, 1957

2,812,414

PRESSURE COOKING APPARATUS

Walter R. Weeks, Louisville, Ky., assignor to General Electric Company, a corporation of New York Application July 19, 1955, Serial No. 523,087

2 Claims. (Cl. 219—20)

This invention relates to pressure cooking apparatus, and more particularly to means for automatically controlling the operation of such apparatus.

The primary object of the invention is to provide pressure cooking apparatus including improved automatic control means for sensing changes in pressure within a pressure cooking vessel, and controlling the heating of the apparatus in accordance with such pressure changes.

Another object of this invention is to provide automatic pressure cooking apparatus which may be conveniently mounted in the body of an electric range, and which does not require any mechanical connections between the pressure cooking vessel and the range for sensing the pressure in the vessel.

Further objects and advantages of my invention will become apparent as the following description proceeds, and the features of novelty which characterize my invention will be pointed out with particularity in the claims annexed to and forming a part of this specification.

Briefly stated, in accordance with one aspect of my invention, I provide a pressure cooking vessel having associated therewith radiant-energy directing means adapted to shift a beam of radiant energy from one path to another in accordance with pressure changes in the vessel. The vessel may be supported in an electric range, for example, provided with a radiant-energy sensitive device arranged to cooperate with the radiation-directing element on the pressure vessel and to control a heating element supplying heat to the pressure vessel.

For a better understanding of my invention reference may be made to the accompanying drawing in which:

Fig. 1 is a fragmentary view showing pressure cooking apparatus constructed in accordance with my invention.

Fig. 2 is a top plan view partly in section of the apparatus shown in Fig. 1.

Fig. 3 is a fragmentary perspective view of the same apparatus.

Fig. 4 is a diagrammatic view showing the elements and arrangement of the control circuit of the invention.

Referring to the drawing, the numeral 1 designates housing structure which in the present embodiment is an electric range including a cooktop 2 having means such as a cylindrical deep well 3 for mounting a horizontally-disposed electric heating unit 4. At the rear of cooktop 2 is an upwardly extending backsplasher 5 in which the controls for the range may be mounted. Located within deep well 3 and supported on heating unit 4 is a pressure vessel 6 provided with a top cover 7 which includes pressure sealing means for sealing the vessel when it is locked in place. Cover sealing mechanisms for pressure vessels are well known in the art and, since the manner in which the cover is sealed does not form a part of the present invention, further description of the sealing mechanism is believed to be unnecessary. Mounted in the cover 7 is an air exhaust and safety valve 8 of any suitable type well known in the art which functions to permit the escape of air during initial heating of the vessel and as the pressure begins to rise, to seal the vessel, and thereafter act as a safety valve which will blow out of cover 7 should the pressure in vessel 6 rise too far above the normal operating range.

My invention is particularly concerned with control means adapted to maintain a high rate of heat input to pressure cooking vessel 6 until the desired cooking pressure is attained, and thereafter to reduce the heat input to a level sufficient to maintain the predetermined cooking pressure, which may be fifteen pounds per square inch, for example. Referring first to Fig. 2 in particular, hollow backsplasher 5 supports therein a source of radiant energy, such as light source 9 mounted in a suitable beam-directing reflector, for example a parabolic mirror 10. Also mounted in backsplasher 5 is a radiant-energy sensitive element, such as a photoelectric cell 11, mounted in a light-concentrating reflector 12. Photoelectric cell 11 may, for example, be of the type which includes cadmium sulphide crystals as the light-sensitive element.

By means hereinafter described, light from source 9, which is directed out of backsplasher 5 through a window 13 or other suitable opening, is reflected so as to effect a change in the resistance of photoelectric cell 11 in accordance with changes in the pressure within pressure cooker 6. Light is admitted to photoelectric cell 11 by means of a window 14 or other suitable opening adjacent window 13, and aligned with a mirror 15 mounted within backsplasher 5 in an inclined position near the open end of a cylindrical tube 16, the other end of tube 16 being closed by reflector 11 within which photocell 12 is located.

Mounted on cover 7 of the pressure cooker in co-operating optical relationship with light source 9 and photocell 11 is a radiant-energy directing device, such as a mirror 17 adapted and arranged to change position in response to pressure changes within the cooker. Mirror 17 is oriented so as to receive light from the source 9 and under certain circumstances to reflect it through window 14 to mirror 15 and by reflection through tube 16 to photocell 11. In the present embodiment of my invention mirror 17 remains in the substantially vertical position shown in Fig. 1 (in which light is reflected through the optical system including mirror 15 and reflector 12 so as to illuminate photocell 11) so long as the pressure is below the predetermined cooking pressure, and is moved to the downwardly inclined position shown in dotted lines when the pressure within the cooker reaches the desired cooking pressure. As best shown in Fig. 1, mirror 17 is pivotally mounted on a supporting arm 18 secured to a pressure valve assembly generally designated by the numeral 19. The pivotal connection between mirror 17 and arm 18 includes a friction washer 18a or other suitable means for maintaining mirror 17 in its vertical position until pressure valve 19 shifts it to its inclined position, and for maintaining it in the latter position until it is manually reset. Valve 19 includes a pressure conduit 20, a valve body 21 having therein a valve seat with which a tapered plug 22 cooperates. Plug 22 is located at the lower end of a valve stem 23 which is spring-biased downwardly into the closed position by means of a spring 24 bearing against a housing 25. Plug 21 may be lifted from its seat so as to vent the cooker by means of a handle 26 pivotally secured to the upper end of the valve stem 23. By means of an arm 27 secured to mirror 17 and engageable with a collar member 23a mirror 17 is movable to its inclined position in response to a predetermined increase in pressure in cooker 6. Inasmuch as the spring force of spring 24 maintains the valve assembly in closed position until the desired or predetermined cooking pressure is reached, mirror 17 remains in its vertical position, and directs light from light source 9 to photocell 11 during the initial cooking period when air in pressure cooker 6 is being exhausted and the pressure is being raised to cooking pressure. Thereafter when the desired cooking pressure is attained mirror 17 is shifted to its titlted position, in which the beam of light from source 9 is reflected downwardly so as to strike backsplasher 5 at a point below window 14, and hence substantially reduces the amount of light falling on photocell 11.

Referring now to the control system for controlling the energization of electric heating unit 4 in accordance with the pressure in vessel 6, heating unit 4 includes a pair of heating elements 4a and 4b as shown in Fig. 4. These heating elements are energized from the usual source of electric power which also supplies the other heating units of the range and is represented in Fig. 4 as supply lines $L_1$ and $L_2$. Maximum heat output from heating unit 4 is obtained by connecting only heating element 4a across line $L_1$, $L_2$ while a lower heat suitable for maintaining pressure in vessel 6 is obtained by connecting both heating elements 4a and 4b in series across lines $L_1$ and $L_2$. It is desirable to provide means for completely de-energizing heating unit 4 at the end of a pressure cooking operation, and accordingly a time switch generally designated by the numeral 28, including a constant speed timer motor 29 arranged to rotate cams 30 and 31 cooperating with switches 32 and 33 respectively and also a manually operable control knob 34. Timer 28 may be conveniently mounted in backsplasher 5 as shown in Fig. 2. To set timer 28 for a timed operation, knob 34 is rotated from its off position to a position in which the desired cooking time, in minutes, is indicated on the scale, such rotation resulting of course in the rotation of the cams 30 and 31 to a position in which switches 32 and 33 are closed. Thereafter, when the timer motor 29 is energized knob 34 is returned to its off position, at which point the flat portion of cams 30 and 31 permit switches 32 and 33 to open. Preferably, motor 29 is connected to the shaft on which cams 30 and 31 and knob 34 are mounted by means of a friction clutch, as those skilled in the art will readily understand.

As illustrated in Fig. 4, light 9 is connected so as to be energized whenever switches 32 and 33 are closed as is photoelectric cell 11, which is connected in series with the operating coil of a relay 35. The switch contacts of relay 35 are connected across the terminals of heating element 4b, and also timer motor 29 in parallel therewith. Consequently, so long as the resistance of photocell 11 is below a predetermined value and relay 35 is thus energized, heating element 4b and timer motor 29 are de-energized and line voltage is applied to the terminals of heating element 4a so as to provide high heat input to pressure vessel 6. Relay 35 is, however, energized only so long as photoelectric cell 11 is illuminated by a beam of light from light source 9, which is directed by reflector 10 out through window 13, reflected by mirror 17 to mirror 15, and finally concentrated on the photocell by reflector 12.

From the foregoing it is evident that after knob 34 of the timer control is rotated away from its off position, and mirror 17 is positioned so as to reflect light from light source 9 to photocell 11, heating element 4a will be energized at its full wattage, and this condition will continue until mirror 17 is shifted to an inclined position as a result of a predetermined increase of pressure within the cooker, whereupon heating elements 4a and 4b will be connected in series so as to reduce the wattage output and also the timing cycle will be initiated by the energization of the timer motor 29.

Considering a typical cooking operation, the pressure vessel 6 is first filled with the desired food and the necessary quantity of water, the cover 7 is locked in place with mirror 17 set vertically and the pressure cooker is positioned in the deep well 3 in cooktop 2 so as to be supported on heating element 4; proper alignment of mirror 17 with respect to windows 13 and 14 in backsplasher 5 may be assured by providing suitable locating pins 7a or the like on the pressure cooker 6 arranged to mate with corresponding openings 2a in the cook-top adjacent deep well 3. Control knob 34 is then rotated so as to indicate the desired cooking time, and the cooking operation is begun. Initially, heating element 4a alone is energized at full voltage so as to rapidly raise the temperature and pressure within the cooker to the desired cooking pressure, such as 15 pounds per square inch. When this desired pressure is attained, valve stem 23 of valve assembly 19 is shifted upwardly so as to incline mirror 17 to its dotted line position and thus the level of illumination required to maintain the resistance at a low value is no longer provided. Hence relay 35 opens, thus energizing heating elements 4a and 4b in series and also energizing timer motor 29 so that the timer cycle is initiated. Heating at the reduced wattage level provided by these heating elements is continued until the desired cooking time has elapsed when switches 32 and 33 are automatically shifted to open position.

While I have shown and described a specific embodiment of my invention, I do not desired my invention to be limited to the particular construction shown and described, and I intend by the appended claims to cover all modifications within the true spirit and scope of my invention.

What I claim is:

1. Pressure cooking apparatus comprising a pressure vessel, housing means for supporting said vessel in heat transfer relation with an electric heating unit carried thereby, a movable mirror mounted on said vessel, means on the vessel responsive to the pressure therein connected to said mirror and adapted to maintain said mirror in a first position at pressures lower than a predetermined cooking pressure and to move said mirror to a second position whenever said cooking pressure is attained, a light source carried by said housing means so as to direct a beam of light on said mirror, a photoelectric cell carried by said housing means, means for shielding said cell from substantially all illumination except light reflected by said mirror from said source when said mirror is in only one of its positions, and means controlled by said photoelectric cell for reducing the heat output of said heating unit in response to movement of said mirror to said second position.

2. Pressure cooking apparatus comprising a pressure vessel having a top cover, a horizontally disposed electric heating unit adapted to support said vessel, housing structure including means for mounting said heating unit and an upwardly extending backsplasher adajcent said heating unit, a pressure valve on said top cover including a plunger movable from a first position to a second position in response to a predetermined increase in pressure within the vessel, a mirror mounted on said top cover and associated with said plunger for movement therewith from a first position to a second position, a light source in said backsplasher provided with a reflector adapted to direct a beam of light on said mirror, a photoelectric cell positioned in said back splasher so as to be illuminated only by light from said source reflected by said mirror when said mirror is in one of its said positions, and means controlled by said photoelectric cell for reducing the heat output of said heating unit in response to movement of said mirror to said second position.

References Cited in the file of this patent

UNITED STATES PATENTS

| | | |
|---|---|---|
| 2,413,128 | Wills | Dec. 24, 1946 |
| 2,420,159 | Wineman | May 6, 1947 |
| 2,424,393 | Graves | July 22, 1947 |
| 2,502,844 | Hildreth | Apr. 4, 1950 |
| 2,667,560 | Clark | Jan. 26, 1954 |
| 2,750,519 | Summerhayes et al. | June 12, 1956 |